March 8, 1955 M. MAUL 2,703,616

AUTOMATIC REPETITION PUNCH FOR RECORD CARDS

Filed Aug. 4, 1952 5 Sheets-Sheet 1

Inventor:
Michael Maul

By [signature]
ATTY.

March 8, 1955 M. MAUL 2,703,616

AUTOMATIC REPETITION PUNCH FOR RECORD CARDS

Filed Aug. 4, 1952 5 Sheets-Sheet 2

Inventor:
Michael Maul

By [signature]
Atty.

March 8, 1955 M. MAUL 2,703,616

AUTOMATIC REPETITION PUNCH FOR RECORD CARDS

Filed Aug. 4, 1952 5 Sheets-Sheet 3

Inventor:
Michael Maul
By [signature]
ATTY.

March 8, 1955 M. MAUL 2,703,616

AUTOMATIC REPETITION PUNCH FOR RECORD CARDS

Filed Aug. 4, 1952 5 Sheets-Sheet 4

Inventor:
Michael Maul

By [signature] Atty.

Inventor:
Michael Maul
BY [signature]
ATTY.

United States Patent Office 2,703,616

Patented Mar. 8, 1955

2,703,616

AUTOMATIC REPETITION PUNCH FOR RECORD CARDS

Michael Maul, Schwabach, near Nurnberg, Germany

Application August 4, 1952, Serial No. 302,557

Claims priority, application Germany August 9, 1951

3 Claims. (Cl. 164—115)

In the art of perforated record cards so called automatic repetition punching machines are frequently employed which permit constant data (such as the date) to be entered into a stack of cards.

In a preferred type of these machines the repetition of punching is controlled in such a way that the data to be repeated are sensed from each preceding card by analyzers and are punched into the subsequent card. It is then only necessary to use as the first card a pattern card in which the data to be repeated are already prepunched which data are then further transferred from card to card.

A particularly efficient type of these machines operates in such a way that the columns of the preceding card are simultaneously analyzed by a set of analyzers and are adapted to control a set of punches simultaneously in all columns, said set of punches operating on the record columns of the subsequent card.

In these machines as, for instance illustrated in the U. S. Patent 2,045,977 of June 30, 1936, there are also used presettable so called "column selectors" permitting the repetition of punching to be rendered effective selectively for any desired column, i. e. for selectively eliminating the control of the analyzing means upon the punching means.

If repetition punching is effected in entirely unpunched cards such a column selector device is not necessary if the first card which leads as a pattern card contains only the data to be repeated. Frequently however, the cards that are to receive the repetition punching are already provided with certain perforations and if no column selectors were provided the variable perforations would also be transferred from each preceding card to the subsequent card which, after some card passages would lead to the fact that all cards are fully punched in all columns and in all hole positions.

Now, the present invention provides a repetition punch that is particularly designed for the perforation of cards having a plurality of so called "perforation decks" each consisting of a series of adjacent hole columns, each column comprising a plurality of index positions. In the present instance, for all perforation decks, a single set of analyzing means common to all decks and a single set of punching means common to all decks is provided, past which the decks are fed one by one. The set of analyzing means extends across the feeding path for the cards over all columns of a deck, and in a similar manner the set of punching means extends across the feeding path for the cards over all columns of a deck. The analyzing means and the punching means are so spaced along the feeding path that a deck of a card is under the punching means when the corresponding deck of the preceding card is under the analyzing means. Though the analyzing means and the punching means are common to all decks, according to the invention an individual column selection is obtained for each perforation deck by means of a separate set of column selectors associated with each perforation deck for selectively eliminating the control of said analyzing means upon said punching means, in combination with means for automatically rendering operative said various sets of selection means one by one in accordance with the passage of the associated decks past said analyzing means and said punching means. In this way, in a single card passage repetition of punching is effected in all or in individual perforation decks in accordance with the perforation column selection in the sets of column selectors associated with the decks.

A particularly simple machine is obtained if for the superpositioned hole columns of the several decks and for all index positions of a column only a single row of analyzers (such as a row of analyzing brushes) is used and if in a similar manner for all columns of the various decks and for all positions of a column only a single row of punches is employed, and if analysis as well as punching is effected index-position-by-index-position.

A preferred embodiment of the invention is illustrated in the accompanying drawings.

*Principle of the operation of the machine*

Figure 1:
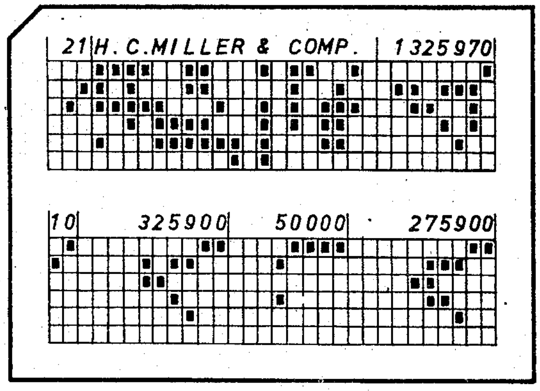
Fig. 1 shows a record card that has subsequently been provided in the machine with certain constant perforation data.
Figure 2:
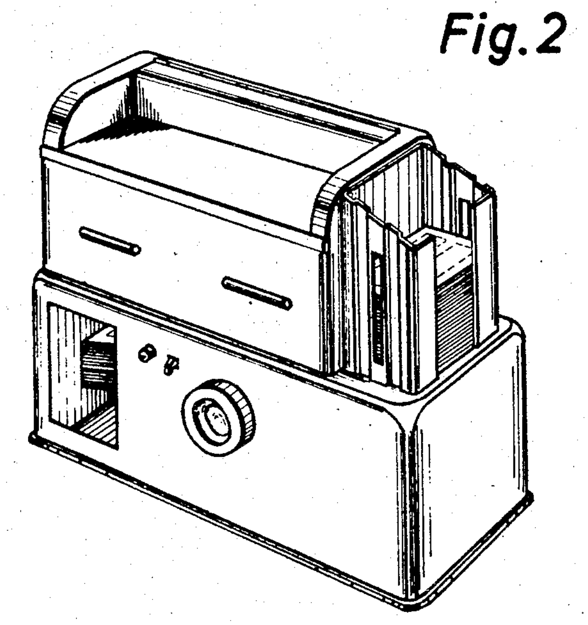
Fig. 2 is a perspective general view of the machine.

The machine operates with cards of which one is shown for instance in Fig. 1. These cards are double deck cards in which each deck contains 30 columns and six hole positions. The characters in the cards are represented by hole combinations.

As a pattern card a card is used in which only the data to be repeated are inserted. If the follower cards are all blank cards a column selector device would not be necessary. However, if the latter is provided in order to permit the transfer also to punched follower cards in certain columns only, in every case the column selection must be effected right from the beginning for the columns which are only to be repeated.

A particular advantage of the machine will be seen in that it punches the cards in a single operation though they are double-deck cards. In operating the machine the pattern card is inserted in the supply magazine 212 as the lowermost card of the card stack. Accordingly the pattern card will be fed as the first card into the machine and past the analyzing device. The result of the analysis is transferred to the punches which will punch the subsequent card in accordance with the punchings of the pattern card.

In the machine described herein card feed is effected step by step. The steps are so proportioned that they correspond to the advance of the card for one position. Accordingly the six positions of a deck are punched one by one. Upon the further operation of the machine now the pattern card will be fed to the card receiver and the card which has just been punched will pass under the analyzing device. The perforations to be repeated will now be analyzed from this card and will be transferred to the next one. This operation cycle will be continued up to the last card. Accordingly, the pattern card will only be analyzed once at the beginning and the card which is punched immediately thereafter will always transfer the constant data to the next card.

The cards are fed from the magazine 212 (Fig. 3) between the rollers 214 by means of the card knife 245. The rollers 214 will feed the card at first under the punching device with the punches 227 and then to the analyzing device with the brushes *b*. Punching or analysis is effected simultaneously for all columns of one deck. The brushes *b* are fastened in the holder 213 mounted in the side walls 210 (Fig. 5) of the machine. The brushes are supplied with current by the contact plate 216 which is inserted in the insulating plate 217 which is also fastened to the side walls 210.

Figures 5, 6, 7:
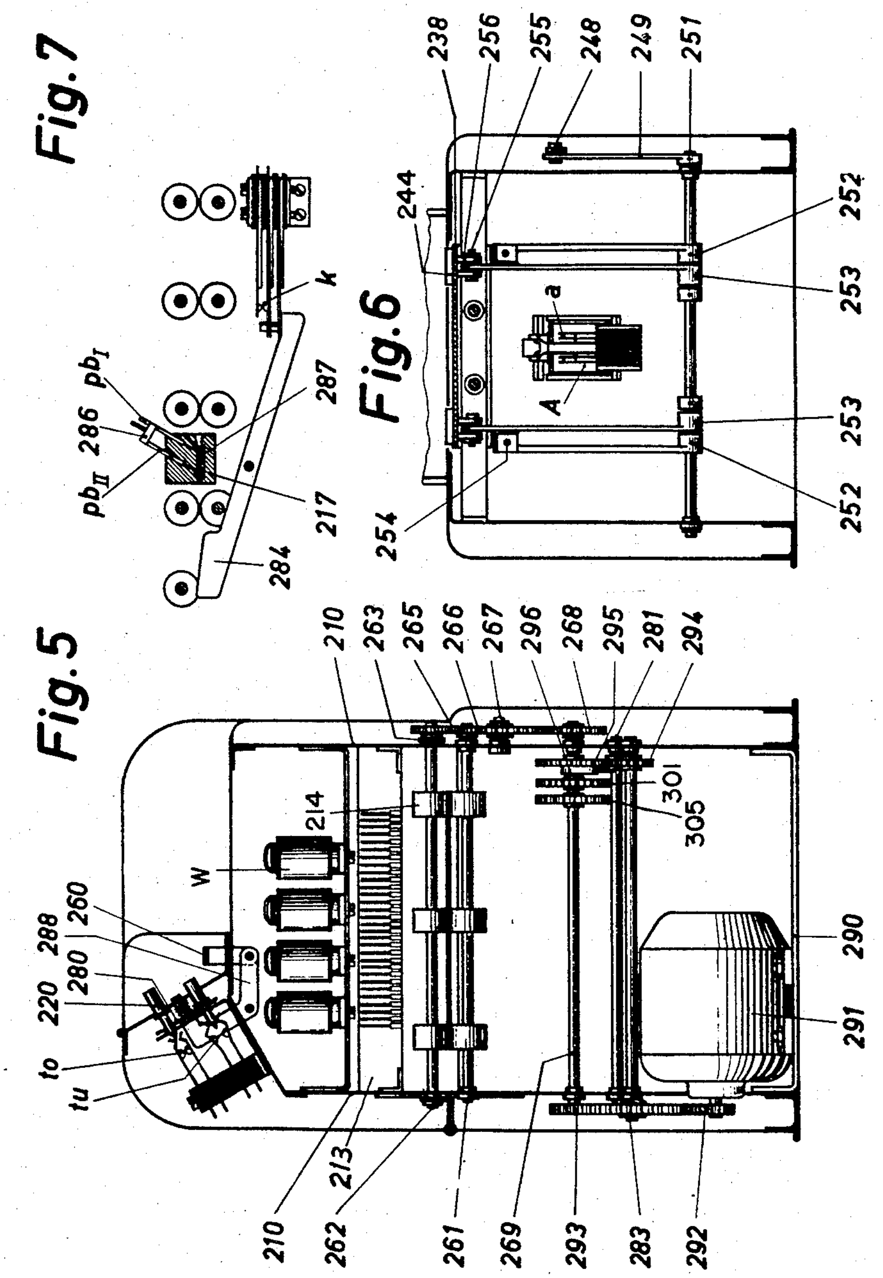
Fig. 5 is a section across the machine, showing the drive, the feed rollers, the selector magnets and selector keys.
Fig. 6 shows the construction of the card feeding means.
Fig. 7 shows the card lever contact as well as the arrangement of the two position checking brushes.

In addition to the analyzing brushes *b* there are also provided two position checking brushes *pb*I and *pb*II (Fig. 7). The latter serve to lock the punch mechanism as long as one of the two brushes is on the contact plate 287. The nature of the locking will be referred to below in connection with the description of the circuit diagram. The position checking brushes are supplied with current from the contact plate 287 which is also inserted in the insulating plate 217. Accordingly, the punches can only operate as long as there is a card under the analyzing brushes *b*. By this means perforating operations on the passage of the first card (pattern card) or of the card margins under the punching device are avoided, since the analyzing brushes *b* rest in this case on the contact plate 216 and could be supplied with current through the latter. The location of the position checking brushes has been so determined that the locking is freed only if the analyzing brushes are just before the first hole position and locking begins shortly after the last hole position has passed under the brushes.

Punching is effected by the punches 227 (Fig. 3) through the selector bars 221 and the yoke 222. The yoke 222 is rocked at each card step in counterclockwise direction about the axis 226 by two push rods 225 arranged on both sides of the card path. The push rods are guided in the guides 228 and in the brackets 229. The push rods 225 are limited in their downward movement by the brackets 229. The upward movement of the push rods is effected by two cams 224 fixed to the shaft 223 which rotates once for each feed step. The drive therefor will be referred to below.

If the magnets W are energized through the analyzing brushes in accordance with the perforations in the card they will attract their armatures 219 which latter move the selector bars 221 to the right. Hence the recess at the right hand end of the selector bars (Fig. 3) will pass under the yoke 222 so that between the yoke and the punch the full cross section of the selector bars will be placed. Now, if the yoke 222 is rocked it will encounter the selector bars and through the latter will press the punches through the card. If the yoke 222 returns to its initial position the punches 227 and the selector bars 221 will be brought upward by the spring 234. The punches are guided in the punch housing 233 and the punch guide 237. Below the punch guide 237 is the matrix 236. The selector bars are guided in a plate 235 which is provided with certain slots and is fastened to the punch housing 233 and to the wall 215. The selector magnets W are screwed to stirrups 230 which are fastened to the side walls 210 of the machine. The armatures 219 and therewith the selector bars 221 are restored to home position by the springs 232.

The drive of the punching yoke 222 and of the card feeding device is effected from the motor 291 (Fig. 5) through pinion 292, the gear 293 and the shaft 283. On the shaft 283 is fast the gear 294, which engages the gear 295. The latter is fixed to the cam 296 and rotatably mounted on the shaft 269. Moreover the gear 295 (Figs. 3 and 4) is engaged by the gear 282 which transmits the movement to gear 297. The latter is fast on the shaft 223 upon which there is provided the fly-wheel 231 and the cams 224 for the punching drive. The stepwise drive for the card feed is effected by cam 296 acting upon a lever 299. The latter is mounted on the axis 247 and is guided in the bracket 302. The lever 299 is urged against the cam 296 by spring 303. On the lever 299 is provided an arm 299*a* on which the pawl 298 is pivotally mounted, which is resiliently urged against ratchet wheel 301 (Fig. 4). As long as the machine is running the cam 296 is rotating and the lever 299 is rocking up and down. In this movement the pawl 298 will shift the ratchet wheel 301 always for one step. The latter is fast on the shaft 269 on which are also fastened the two gears 268 and 305. The gear 268 drives through gear 266 the gear 265 (Fig. 5) which latter is fast together with the rollers 214 on the shaft 261. The gear 266 also drives directly or by intermediate gears the other pairs of feed rollers. The lower rollers are mounted with their shafts 261 in the two side walls 210. The upper rollers however are mounted with their shafts 262 in arms 263 which are fastened by means of extension screws 272 (Fig. 4) about which said arms may rock. By means of springs 264 (Fig. 3) the upper rollers are pressed against the lower rollers.

The drive for the card knives is effected by the crank 246 (Fig. 4) on the shaft 247 which latter are driven by the gear 305 through gear 304. To the crank 246 the rocker 249 is connected by link 248. The rocker 249 as well as the two levers 252 (Figs. 3, 4 and 6) are fast on the shaft 251 and rock to and fro in accordance with the movement of the crank, the levers 252 taking with them the levers 253 which are freely mounted on the shaft 251. The engagement is effected through the screws 254 which permit an exact adjustment of the card knives. The slide 238 carrying the card knives 245 is moved by the two levers 253. The slide is guided on the two bars 240.

When the cards have passed through the machine they drop into the card receiver 273 (Figs. 3 and 4) on the carriage 274. The latter is guided by the rollers 276 and pressed upward by the springs 275. When the card carriage reaches its lowermost position it will open its contact *m* thereby stopping the machine.

As may be seen from the description the set of analyzing brushes as well as the punching mechanism is common to both perforation decks. Perforation of the card however is effected for both decks in a single card passage. Now, in order to permit exclusion of any desired column of any desired deck at will, a column selector device is provided which, in contradistinction to the analyzing and punching means is separate for each deck.

Figure 3:
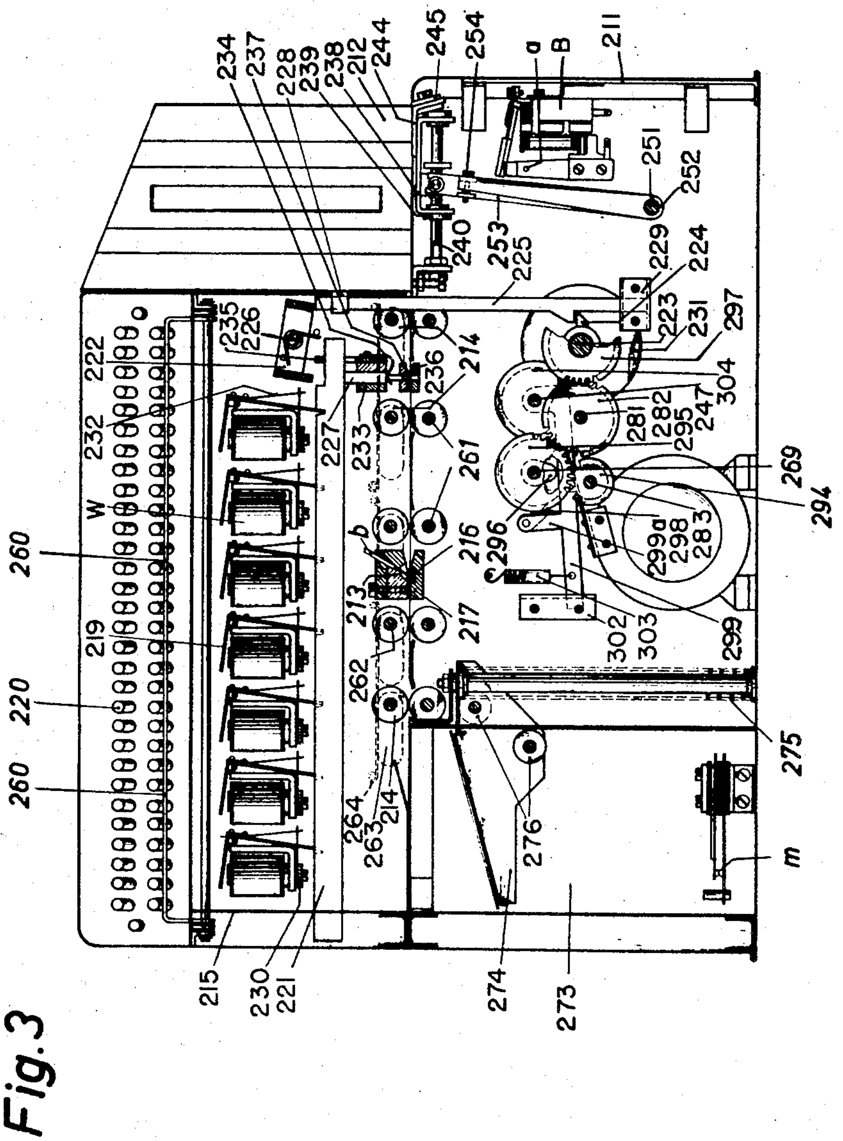
Fig. 3 shows the machine in longitudinal section.
Figure 4:
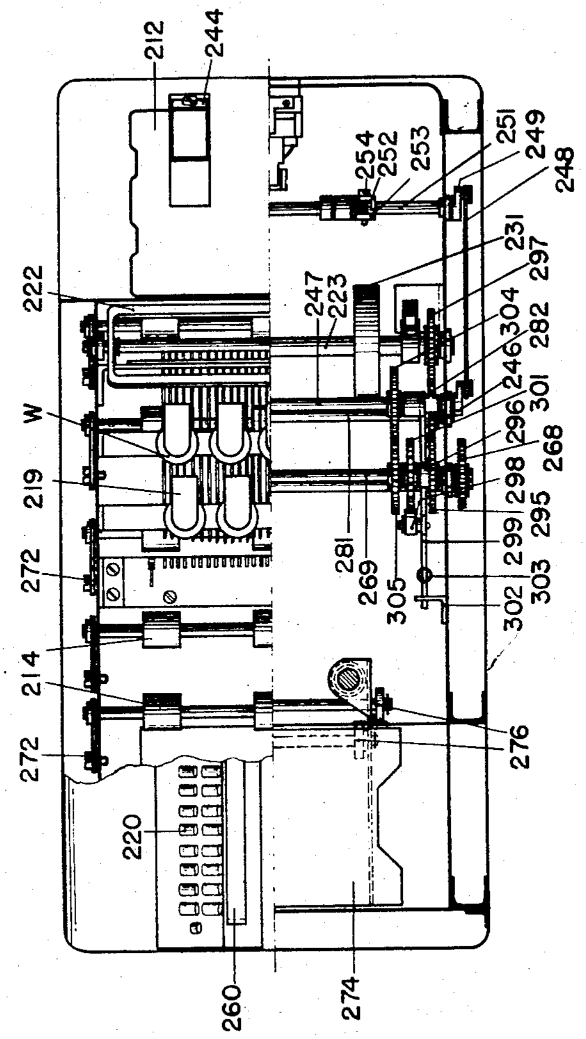
Fig. 4 is a plan view of the machine from which may be seen the arrangement of the selector keys, the feed rollers, the selector magnets with the punching yoke, the magazines and the drive.

The arrangement of the column selector keys may be seen from Figs. 3 and 5. The selector keys are provided on the upper side of the machine casing in two rows each comprising 30 keys 220 and wherein the upper row corresponds to the upper and the lower row to the lower deck. On the keys there are column designations not shown in the drawings. If a column of any deck is to be eliminated from the transfer the corresponding key 220 is depressed and thereby opens its associated contact *to* (of the upper deck) or *tu* (of the lower deck). The key board is of very simple construction. The keys proper are not resiliently mounted since in the depressed position they are held between the contact springs and in the rest position they are automatically held in the outer position by the cone shaped ends of the contact springs.

The keys and the contacts are comprised in a key strip which is arranged on the upper side of the machine and is easily accessible. The keys are secured against unintentional displacement by a cover raisable about hinges. The operation of the column selector device will be described in the explanation of the circuit diagram. In order to facilitate raising of all keys a stirrup 260 has been provided which can restore all depressed keys outwardly through two bell crank levers 288 (Fig. 5) and a plate 280.

Figure 9:
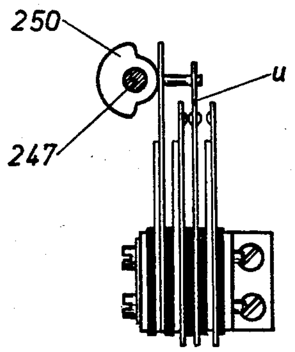
Fig. 9 shows the cam contact for shifting the column selector device upon deck change.

Switching of the wiring device upon deck change is effected by the contact *u* (Fig. 9) which is controlled by the cam 250. The latter is fast upon the shaft 247 which rotates once per card.

Figure 8:
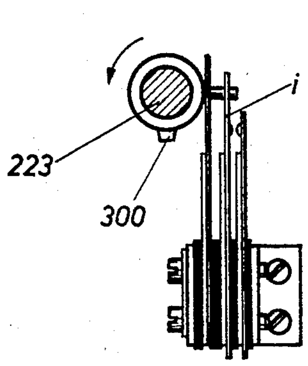
Fig. 8 shows a cam contact which closes the current circuit to the brushes only if there is a hole position under the latter.

Sparking at the brushes which would lead to burning or rapid wear and therewith to inaccurate operation of the machine must be avoided. In order to avoid sparking the contact between the brushes and the current supply bar is always interrupted when without current. This is achieved by inserting a contact *i* in the current circuit to the brushes, which opens shortly after the analysis thereby interrupting the whole current circuit to the brushes. This contact is in the form of a cam contact (Fig. 8). It is controlled by the cam 300 mounted on shaft 223 which rotates once per card step or analyzing cycle. The shape of the cam and the position of the same have been so provided that the contact is closed only until the hole positions come to rest under the analyzing device.

*Circuit diagram*

In the illustration of the circuit diagram for the rapid punch a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number. The relays and magnets are indicated by capitals and the contacts which they actuate by the corresponding small letters. Manually actuated contacts are characterized by a key-like hook on the upper end of the contact member. Generally, the convention is such that the characters are situated to the right of the associated magnets, relays and contacts or above the wiring symbol respectively as far as they have no influence upon the clarity. The contacts are shown in the positions which they occupy when the machine is at rest.

Figure 10:
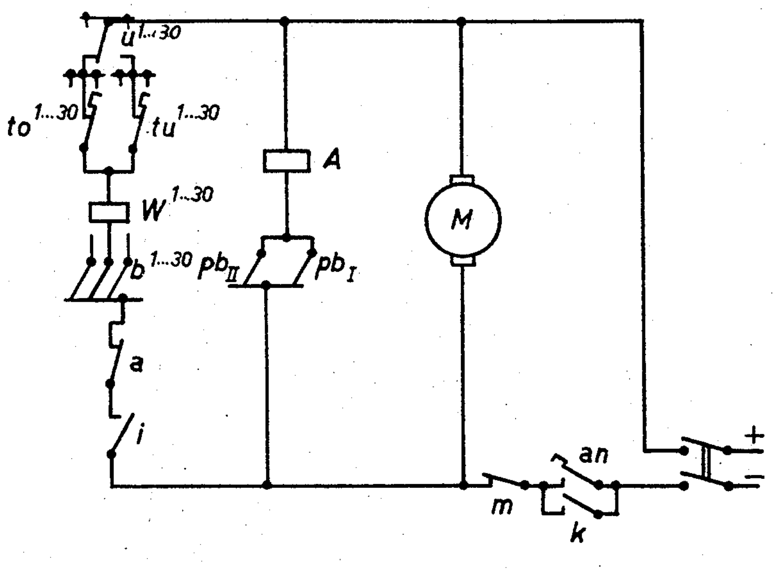
Fig. 10 shows the circuit diagram of the machine.

If the machine is switched in, it will not yet start to run. It is only if the start key "*an*" (Fig. 10) is actuated that current can flow from negative through the contacts "*an*" and *m* and the motor M to positive. The machine will now start to run and will feed cards to the analyzing device. In order to prevent the brushes and the selector magnets from being supplied with current before there is a card under the analyzing device, position checking brushes $pb_{I}$ and $pb_{II}$ are provided. As has already been described, the latter rest on the contact plate 287. If now the start key has been depressed the relay A will be energized through the two brushes *pb* and opens its contact *a* which interrupts the current to the analyzing brushes *b*. Consequently no current can flow through the selector magnet circuit and the analyzing brush circuit. After the first card has reached the analyzing device it actuates the card lever 284 (Fig. 7). The contact *k* will be closed by the latter and the start key "*an*" may be released. The motor will now receive current through the card lever contact *k*.

When the first card arrives under the second position checking brush $pb_{II}$ the current circuit through relay A will be interrupted, the latter will drop and the contact *a* will close. Shortly before the first hole position arrives under the brushes the contact *i* will be closed by cam 300 and the contact bar 216 will be connected to the potential. If now a brush *b* passes through a hole in the card it will establish contact with the contact bar and current can flow from negative through the contacts *k, m, i, a,* the brush *b,* the selector magnet W, the key contact *to,* contact *u* to positive. In accordance with the perforation of the card the current circuit will also extend through other brushes and selector magnets.

Before the card is shifted to the next position the contact *i* opens and interrupts the current circuit through the brushes so that the latter will be cut off from the current. In the next position the same operation will be repeated until the whole upper deck is analyzed. This being completed the contacts *u* will be shifted by the cam 247 to the key contacts *tu*. Upon the transfer of the lower deck no current will flow from the selector magnets W through the contacts *to* but through *tu*. The contacts *tu* are interrupted in accordance with the eliminations in the second deck so that in these columns no transfer can be effected. When the card has been analyzed and there is a card change the cam 250 will shift the contact *u* again to the contacts *to* and the operating cycle will begin anew.

When the card receiver is filled the contact *m* will be opened by the card carriage whereby the whole current circuit is interrupted, and the machine is stopped. The same will occur if no further cards are fed and if the card lever returns to its initial position. In this instance the contact *k* interrupts the whole current circuit.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In an automatic repetition punch for multi-deck cards having in each deck a plurality of adjacent record columns, each column being adapted to represent in index positions of the column a character designation, a single row of analyzing means for all columns of a deck including one analyzer for each column, said row of analyzers being comon to all decks, a single row of punches for all columns of a deck including one punch for each column, said row of punches being common to all decks, means for feeding said record cards automatically one by one at first index position by index position and deck by deck past said row of punches and then index position by index position and deck by deck past said row of analyzing means, an index position of the preceding card being under the analyzer while the corresponding index position of the subsequent card is under the punch, means for controlling said punches by said analyzers, a separate row of selectors for each deck including one selector for each column of a deck for selectively eliminating the control of said analyzers upon said punches, and means for automatically including said rows of selectors operatively one by one in said controlling means in accordance with the passage of the associated decks past said analyzing means and said punching means.

2. In an automatic repetition punch for multi-deck cards having in each deck a plurality of adjacent record columns, each column being adapted to represent in index positions of the column a character designation, feeding means extending along a feeding path for said cards, a single set of analyzing means across said feeding path extending over all columns of a deck but common to all decks, a single set of punching means across said feeding path extending over all columns of a deck but common to all decks, said feeding means feeding said cards automatically one by one at first deck by deck past said set of punching means and then deck by deck past said set of analyzing means, a deck of a preceding card being under the analyzing means while the corresponding deck of a subsequent card is under the punching means, means for controlling said punching means by said analyzing means, a separate set of selection means for the columns of each deck for selectively eliminating the control of said analyzing means upon said punching means, and means for automatically rendering operative said various sets of selection means one by one in accordance with the passage of the associated decks past said analyzing means and said punching means.

3. In an automatic repetition punch for multi-deck cards having in each deck a plurality of adjacent record columns, each column being adapted to represent in index positions of the column a character designation, a single row of analyzers for all columns of a deck including one analyzer for each column, said row of analyzers being common to all decks, a single row of punches for all columns of a deck including one punch for each column, said row of punches being common to all decks, means for feeding said record cards automatically one by one at first index position by index position and deck by deck past said row of punches and then index position by index position and deck by deck past said row of analyzers, an index position of a preceding card being under the analyzer while the corresponding index position of a subsequent card is under the punch, an electromagnet associated with each punch for controlling the latter, said electromagnet being under the control of an analyzer, a separate row of manually settable selector contacts for each deck including one selector contact for each column of a deck for selectively eliminating the control of said analyzers upon said punches, and means for automatically including said rows of selector contacts operatively one by one in the circuit of said analyzers and said punch controlling magnets in accordance with the passage of the associated decks past said row of analyzers and said row of punches.

References Cited in the file of this patent

UNITED STATES PATENTS

| | | |
|---|---|---|
| Re. 21,133 | Lake | June 27, 1939 |
| 1,761,682 | Reynolds | June 3, 1930 |